Patented May 25, 1943

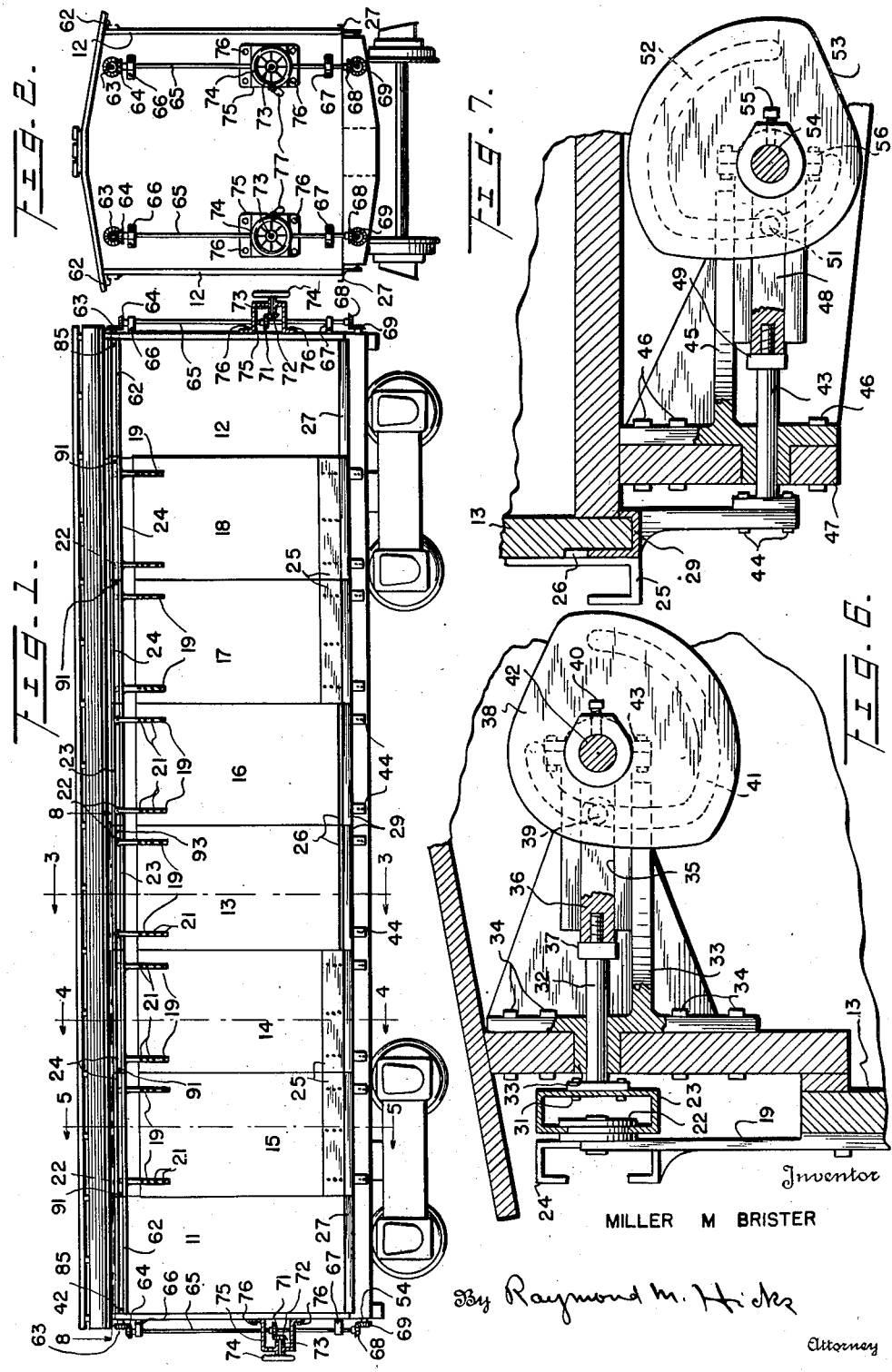

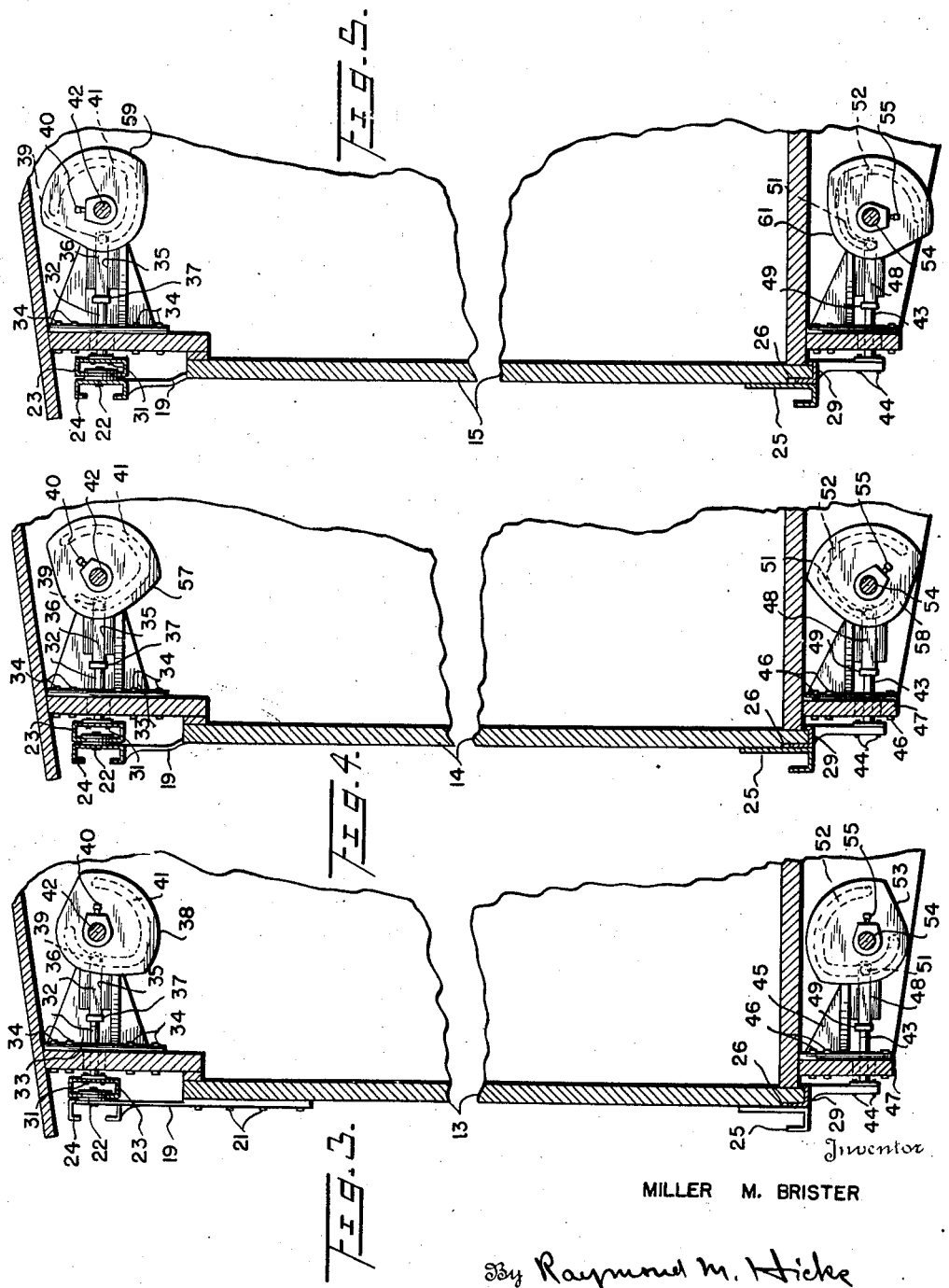

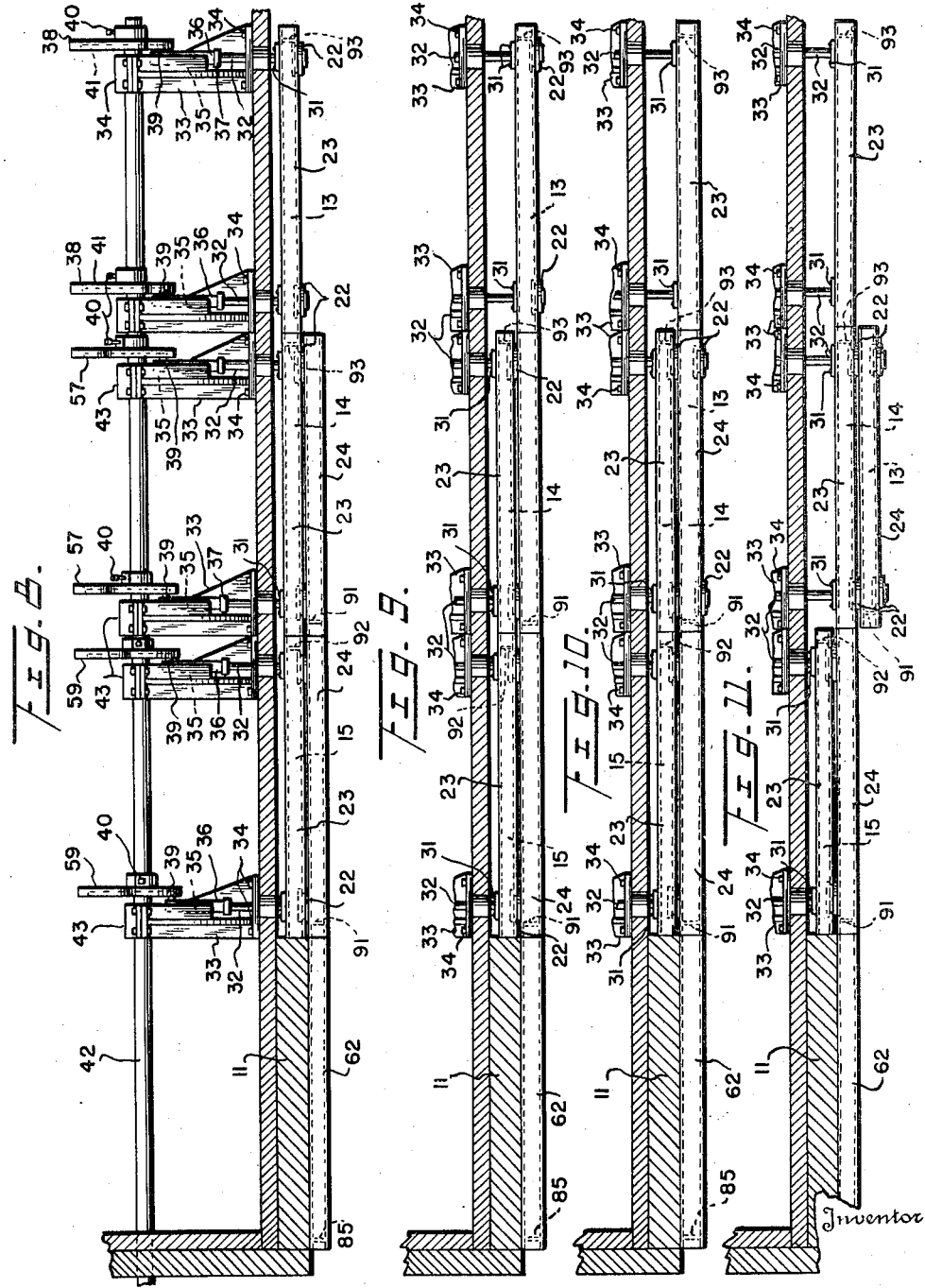

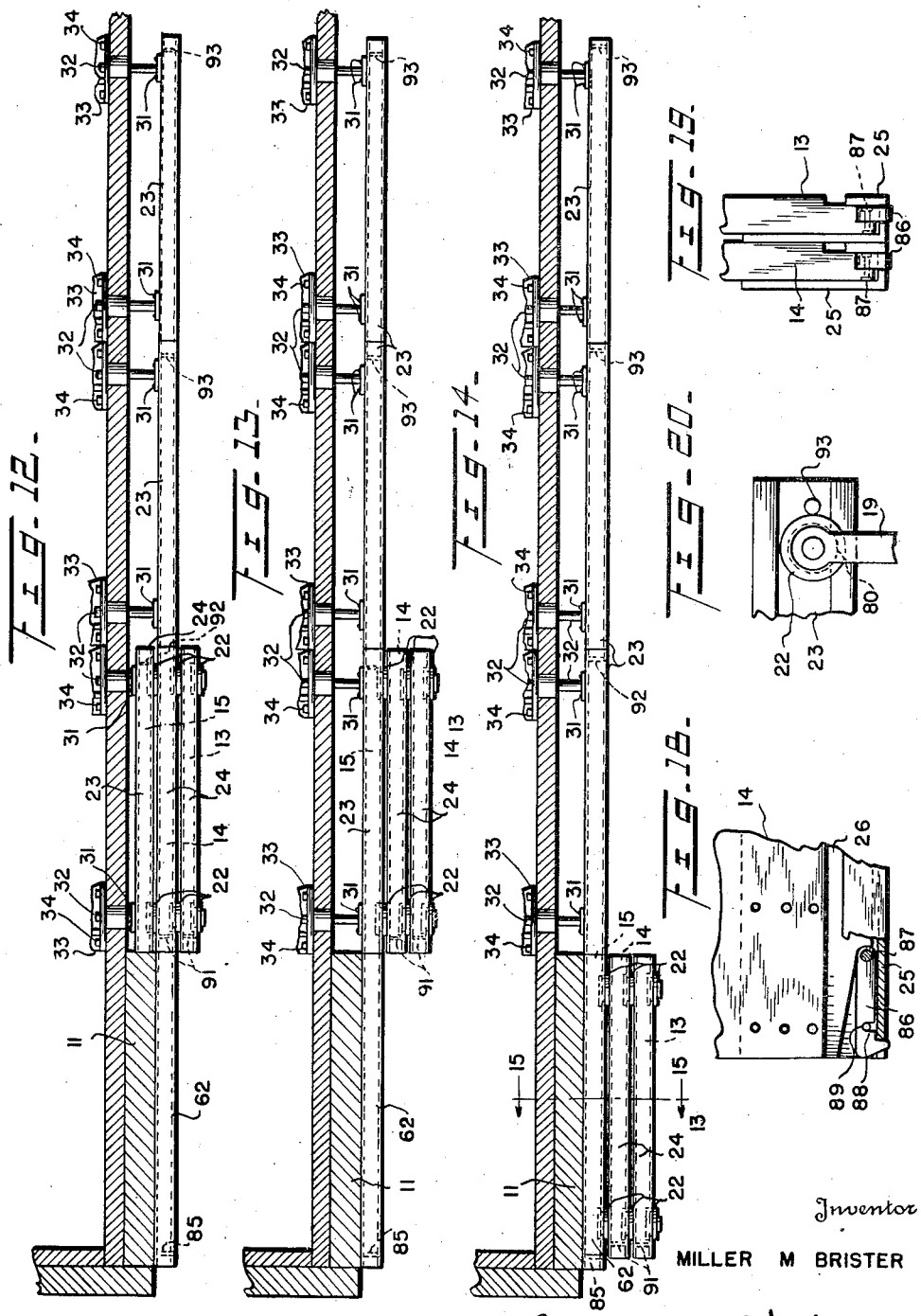

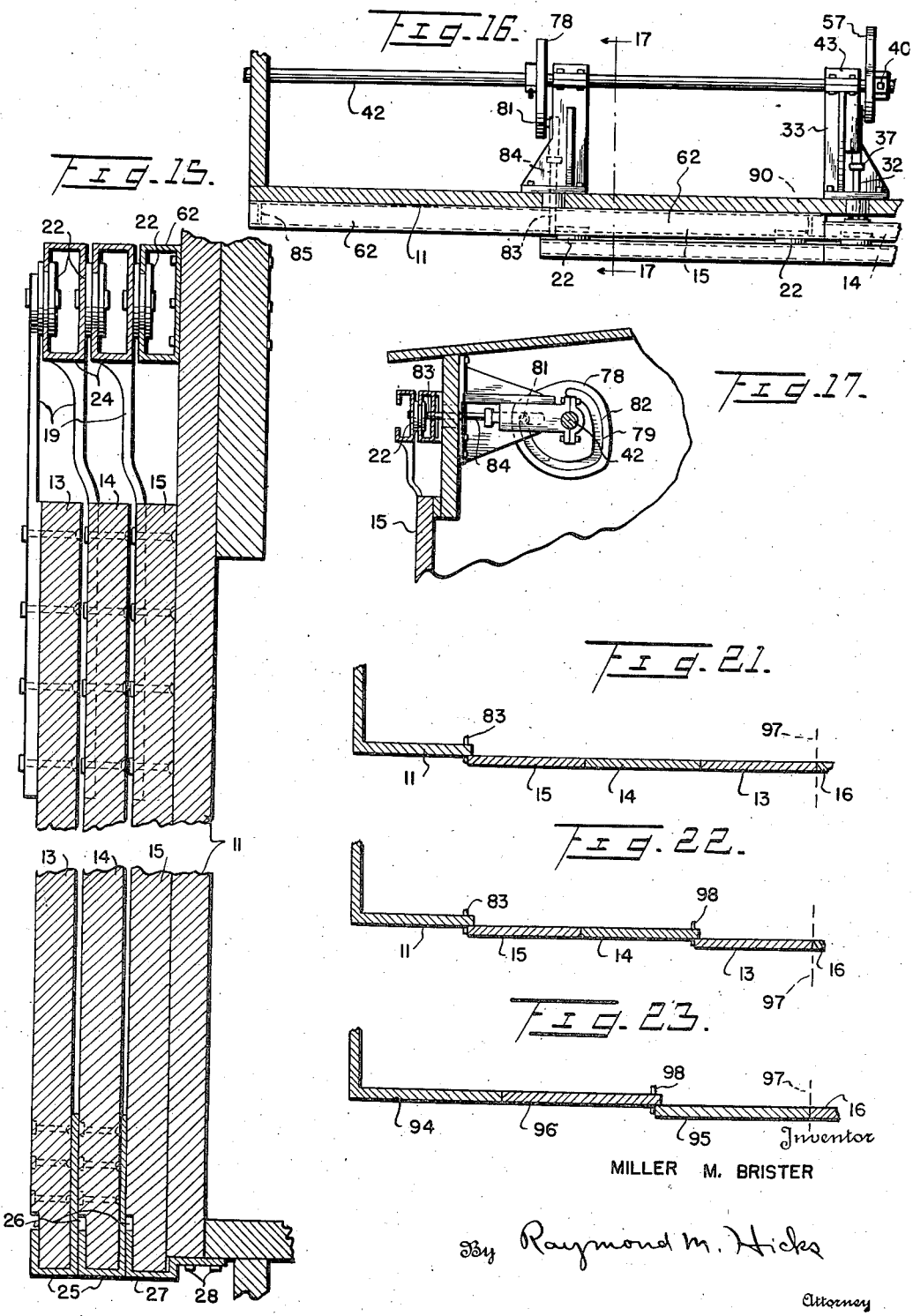

2,320,216

UNITED STATES PATENT OFFICE 2,320,216

FREIGHT CAR

Miller M. Brister, New York, N. Y.

Application February 3, 1942, Serial No. 429,425

21 Claims. (Cl. 20—23)

This invention relates to freight cars adapted for the transportation of bulky articles of freight such, for example, as lumber and other commodities or merchandise in which a shipment may be loaded or unloaded quickly, economically and with a minimum of delay. More specifically, the invention relates to improvements in freight car construction in which substantially an entire side of the car may be readily opened and closed within a relatively short space of time without the possibility of interfering with the movement or passage of cars on an adjoining track or without interfering with the shed or loading platform adjacent the path of travel of the car.

Various devices have heretofore been proposed for increasing the size of the aperture within a box car through which the loading and unloading of the car takes place, the devices comprising removable sections, vertically sliding sections, pivoted doors and the like. Such devices have proved not altogether satisfactory in service by reason of the complicated mechanism employed for operating the movable sections and doors and for the additional reason that there is a possibility of interfering with the movement of the cars and possible derailment of the same as the result of carelessness on the part of employees of the railroad in the operation of the devices.

It is the general practice in the transportation of bulky articles of merchandise such, for example, as lumber in freight cars to make a charge for the transportation of the merchandise in accordance with the distance through which the merchandise is carried and the time of the car out of service required for loading and unloading the car. The productivity of a car from a railroad standpoint is increased in proportion to the decrease in the time required for loading and unloading the same and with the types of freight cars now in general use in which the door openings comprise a relatively small fractional portion of the side of the car, the time required to load a freight car to capacity with bulky articles of merchandise such, for example, as lumber and the time required to unload the same through the small door openings provided is such that the car is held out of service on a siding for a period of time sufficient to cause an additional charge to be applied to the shipment in excess of the regular freight charge between the shipping point and the destination, this additional charge being referred to herein as a demurrage charge. The time within which a freight car is allowed to stand at a siding for the purpose of loading and unloading the same without the imposition of a demurrage charge is referred to herein as the minimum demurrage time.

The proportion of freight cars effectively used by the railroads for the transportation of goods or freight is determined to a considerable degree by the time required for loading and unloading the cars and the disruption of regular traffic of the railroad from this cause. A decrease in the loading and unloading times of the car would increase the earnings of the car and enable the railroads to handle a greater volume of freight traffic and reduce the ratio of investment in rolling stock to earnings per car under existing tariffs. Shippers having their own sidings would be able to make better use of their platform facilities, freight handling equipment, and arrange more favorable pickup and delivery schedules with the common carriers. Furthermore, the saving in holding time of the freight cars would enable the cars to be moved in and out of a siding with less delay during the loading and unloading operations whereby smaller sidings and freight terminal facilities may be employed to handle a predetermined volume of freight traffic. Particularly, in times such as the present when a state of national emergency exists, the present invention is adapted to be applied to freight cars of existing types in which the conversion thereof to cars of improved design may be made easily, economically and with a minimum of added material. The increased size of the aperture within the sides of the improved cars would enable certain bulky articles of freight now required to be carried by flat cars to be loaded into the improved car thereby eliminating the necessity for weatherproofing such articles of freight and at the same time greatly reducing the large number of empty flat cars now hauled by the railroad. The improved car is also adapted to transport corrosive articles of freight such, for example, as salt and the like without interfering in any way with the operation of the doors of the cars. In regard to the transportation of perishable commodities, closer delivery schedules could be arranged in which the commodities would arrive at the point of destination in more marketable condition and the proportion of the commodities spoiled in transit would be reduced.

The present invention provides new and improved means for the transportation and handling of bulky articles of merchandise such, for example, as lumber in freight cars of railroads, trucking companies, express companies, or the like in which all of the advantages of the prior devices are retained and in which the disadvantages of the prior devices are eliminated.

One of the objects of the present invention resides in the provision of new and improved box car construction in which substantially an entire side of the car is opened for loading and unloading the same.

Another object is to reduce the length of time required for loading and unloading freight cars, to facilitate loading the car to capacity, and to make full loading of the car safer for the handler.

Another of the objects is the provision of new and improved means for mounting and controlling the movement of doors on a box car whereby an aperture of substantially the entire side of the car is exposed for the movement and storage of bulky merchandise therein with a minimum of delay during the loading and unloading of the car.

Another object is the provision of means for reducing the demurrage charge of a shipment of bulky merchandise in a box car.

Another object is the provision of new and improved freight car construction in which the means employed for closing the freight car are economical to manufacture, reliable in operation, and possess all the qualities of ruggedness and durability and in which no substantial impediment is afforded to the rapid loading and unloading of large pieces of lumber.

Still other objects, advantages and improvements will be apparent from the following description taken in connection with the accompanying drawings of which:

Fig. 1 is a view in elevation of a box car employing the device of the prevent invention;

Fig. 2 is an end view in elevating of the box car of Fig. 1;

Fig. 3 is an enlarged sectional view of a door and the control mechanism therefor taken along the line 3—3 of Fig. 1;

Fig. 4 is an enlarged sectional view of another of the doors and the control mechanim therefor taken along the line 4—4 of Fig. 1;

Fig. 5 is an enlarged sectional view of still another of the doors and the control mechanism therefor taken along the line 5—5 of Fig. 1;

Fig. 6 is a considerably enlarged view of the upper control device of Fig. 3;

Fig. 7 is a considerably enlarged view of the lower control device of Fig. 3;

Fig. 8 is a view somewhat enlarged taken along the line 8—8 of Fig. 1;

Fig. 9 is a view similar to Fig. 8 but showing the first door in the extended position;

Fig. 10 is a view similar to Fig. 9 with the first door supported by the second door;

Fig. 11 is a view similar to Fig. 10 with the second door in the extended position;

Fig. 12 is a view showing the first and second doors supported by the third door;

Fig. 13 is a view similar to Fig. 12 with the third door in the extended position;

Fig. 14 is a view similar to Fig. 13 with the doors moved to the final open position;

Fig. 15 is a view somewhat enlarged taken along the line 15—15 of Fig. 14;

Fig. 16 is a view showing a locking arrangement suitable for use with the present invention;

Fig. 17 is a view taken along the line 17—17 of Fig. 16;

Fig. 18 is a detailed view partially in section of a latch member for maintaining the doors in their opened positions;

Fig. 19 is an end view in elevation showing the latch mechanism for two doors;

Fig. 20 is a detailed view showing a fragmentary portion of a rail section and means for preventing accidental movement of the door along the rail; and Figs. 21, 22 and 23 show alternative arrangement in diagrammatic form of the doors of a freight car arranged in accordance with the present invention.

Referring now to the drawings and more particularly to Fig. 1 thereof, there is shown thereon a view in elevation of a freight car in accordance with the present invention comprising the end sections 11 and 12 and a plurality of sliding doors 13, 14, 15, 16, 17 and 18 supported by the brackets 19 secured thereto as by the bolts 21 and having a plurality of wheels 22 pivotally mounted thereon. The doors 13, 14, and 15 comprise a set operable in predetermined sequential order and adapted to be arranged one behind another in matching relation with the end section 11 when the doors are in the fully opened position. In a similar manner, the doors 16, 17 and 18 are adapted to be arranged in matching relation with the end section 12 at the opposite end of the car. It will, of course, be understood that the arrangement of doors shown on Fig. 1 is the same on both sides of the car.

The wheels 22 are supported by a plurality of movable rails or rail sections 23 along which the wheels are adapted to roll. The doors 14, 15, 17 and 18 are each provided with a rail or track 24 secured thereto in any well known manner such that the movable rail or track 23 of each of the sections will be in alinement with the rail 24 of the adjacent door when the rail section 23 is moved to an outward position. The doors 14, 15, 17 and 18 are each provided with a U or channel-shaped guide 25, Fig. 7, secured to the lower portion thereof and adapted to be engaged by the lower portion of the adjoining door. Each of the doors 13, 14 and 15 is provided with a complementary cut-away portion 26 at the lower portion thereof, Fig. 15, whereby the doors will be closely stacked in the open position thereof. There is secured to the lower portion of each of the end sections 11 and 12 a channel or U-shaped guide rail 27 secured thereto in any suitable manner as by the bolts 28, Fig. 15, having a bent up portion adapted to be engaged by the cut-away portion 26 of the doors 15 and 18, respectively, when the doors are moved to open position. There is also provided at the bottom end of each of the doors a movable guide rail section 29 adapted to move synchronously with the upper rail section 23 as the doors are operated, in such a manner that the doors are moved outwardly from the car by certain cam controlled mechanism and thereafter rolled into stacking engagement with each other whereby the doors are stacked in front of the end sections 11 and 12 in such a manner that substantially the entire side of the car is made available for loading and unloading freight.

The cam controlled mechanism for operating the doors 13, 14 and 15 is shown on Figs. 3, 4 and 5 respectively, the cam mechanism for controlling the upper and lower ends of the door 13 being shown in somewhat enlarged form on Figs. 6 and 7 respectively.

Referring now to Fig. 6, the door 13 is shown suspended from the rail section 23 attached preferably near each end thereof to a shaft 32 having a flanged portion against which the rail member 23 is securely clamped as by the bolts 31. The shaft 32 is slideably supported by the member 33 secured to the side of the car as by the bolts 34, the member 33 having a grooved portion 35 within which the bar 36 is adapted to slide. The shaft 32 is secured in threaded engagement with the bar 36 as by the nut 37 whereby the shaft and bar are adapted to be moved inward or outward, as the case may be, in accordance with the direction of movement of the cam member 38, thereby providing an arrangement in which the movable guide rail section 23 may be adjusted with respect to the cam mechanism in such a manner that the movable rail 23 of the door 13 is brought into alinement with the guide rail 24 of the next succeeding door 14 as the rail 23 is moved to the extended position thereof. Secured to the slideable bar 36 in any well known manner is a cam follower 39 adapted to engage the grooved portion 41 of the cam member whereby the shaft 32 and rail section 23 are moved inward or outward by the cam member 38 in accordance with the direction of rotation of the cam member. The cam is secured to a shaft 42 as by the set screw or bolt 40, the shaft 42 being rotatably supported by the bearing 43 affixed to the member 33.

On Fig. 7 is shown the mechanism for controlling the movement of the lower portion of the door 13 comprising a guide member 29 secured preferably near each end thereof to a shaft 43 as by the bolts 44, the shaft 43 being slideably supported within the support 45. The bolts 46 are employed preferably for securing the support 45 to the lower portion 47 of the freight car. The shaft 43 is maintained in threaded engagement with the sliding bar 48 as by the nut 49 whereby the movable guide member 29 may be brought into alinement with the guide rail 25 of the next succeeding door 14 as the guide member 29 of the door 13 is moved to the extended position thereof. The bar 48 is provided with a cam follower 51 adapted to engage the slotted cam portion 52 of the cam member 53. The cam 53 is maintained in rigid engagement with the shaft 54 as by the set screw or bolt 55, the shaft 54 being rotatably supported by the bearing 56.

The cam and sliding rail arrangement for the doors 14 and 15 shown on Figs. 4 and 5 respectively is similar to the arrangement of Fig. 3 except that the cams 57 and 58 of Fig. 4 are shifted by a predetermined angle of displacement on the shafts 42 and 54 such, for example, as an angle of 60 degrees from the cams 38 and 53 respectively. In like manner, the cams 59 and 61 are secured to the shafts 42 and 54 at an additional angle of displacement such, for example, as 60 degrees from the cams 57 and 58 respectively.

On Fig. 8 is shown the pairs of cams 38, 57 and 59 assembled on the shaft 42, the cams 38 controlling the movement of the guide rail section 23 for the door 13, the cams 57 controlling the movement of the guide rail section for the door 14, and the cams 59 controlling the movement of the guide rail section for the door 15 inward or outward, as the case may be. Furthermore, on Fig. 8, the doors 13, 14 and 15 are shown in closed position in abutting relation with each other and with the end section 11, all of the rail sections 23 being in the retracted position. On Fig. 9 is shown the rail section 23 of the door 13 in an extended position in alinement with the rail section 24 of the door 14, the shaft 42 having been rotated through an angle of 60 degrees from the initial position thereof.

On Fig. 10 is shown the door 13 moved from the rail 23 into suspended engagement with the rail 24 of the door 14. On Fig. 11 is shown the rail 23 of the door 14 moved to the extended position in alinement with the rail 24 of the door 15, the shaft 42 having been moved through an additional angle of substantially 60 degrees. On Fig. 12 is shown the door 14 transferred from the guide rail section 23 of the door 14 into suspended engagement with the rail 24 of door 15, the door 15 now supporting the doors 14 and 13. Fig. 13 shows the rail section 23 of the door 15 moved to the extended position in alinement with the rail section 62 affixed to the upper section of the end space 11 of the car, and Fig. 14 shows the doors 15, 14 and 13 supported by the rail section 62, the movable rail sections 23 of the doors 14, 15 and 16 being in the extended position.

The shaft 42, it will be noted, is provided with a gear 63, Fig. 1, in meshed engagement with the gear 64 secured to the shaft 65 supported by the bearings 66 and 67. The other end of the shaft 65 is provided with a gear 68 in engagement with a gear 69 secured to the shaft 54 whereby the shafts 42 and 54 rotate synchronously in opposite directions in response to movement of the shaft 65. There is also secured to the shaft 65 a gear 71 in engagement with the gear 72 mounted on the shaft 73 to which is secured the hand wheel 74 supported by a bracket 75 securely attached to the end of the freight car as by the bolts 76. The hand wheel is provided preferably with a projection having an aperture therein adapted to receive a lock as 77 whereby the wheel is securely locked to the bracket 75 and movement of the doors from the closed position thereof by unauthorized persons is prevented.

From the foregoing it will be apparent that movement of the rail sections 23 of the doors 13, 14 and 15 is accomplished by the synchronous movement of the corresponding lower rail sections 29 of each of the doors respectively by reason of the geared connection between the shafts 42 and 54.

On Figs. 16 and 17 is shown a mechanism suitable for locking the door 15 in the closed position thereof when the arrangement of the doors of Figs. 21 or 22 is employed. For this purpose there is provided a cam 78 on the shaft 42 having a slotted portion 79 therein adapted to be engaged by the cam follower 81 in such a manner that the portion of the cam surface indicated generally at 82 is in engagement with the cam follower when the guide rail 23 of the door 15 has been moved to the open position thereof thereby withdrawing the extended portion 83 of the shaft 84 from the path of travel of the door 15 in response to movement of the shaft 42. The cam member 78 is generally similar to, or may be identical with the cam member 38 if desired, it being merely necessary to assemble the cam 78 reversely on the shaft 42 whereby the shaft 84 is moved inward in response to movement of the shaft 42 in the direction to cause the movable rail sections 23 to be moved outward.

The protruding portion 83 of the shaft 84 may be arranged in any suitable manner to prevent the premature release of the door 15 until the movable rail section 23 of the door 14 has been moved to the extended position as by disposing the extending end 83 of the shaft within the path of travel of the wheel 22 of the door 15.

The rail section 62, it will be noted, is provided with a stop member 85 at one end and a stop member 90 at the other end thereof whereby the movement of the door 15 beyond the ends of the guide rail 62 is prevented. A guide rail is provided preferably at the lower end of the section of the car beneath the rail section 62 whereby the lower end of the door 15 is prevented from substantial movement outward from the car when the door 15 is in open position and, if desired, the stop members 85 and 90 may be supported by the lower guide rail instead of by the rail section 62, as illustrated. Furthermore, the locking member 83 for the door 15 may, if desired, be controlled by a cam secured to the shaft 54, or two locking members controlled by both of the shafts 42 and 54 respectively may be provided to maintain the door 15 in locked position.

On each of the doors 13 and 14 is provided a latch 86, Fig. 18, preferably recessed therein and pivoted as at 87 in such a manner that the latch falls over and engages the forward end of the rail 25 of the next succeeding door. In like manner, the door 15 is provided with a latch 86 adapted to engage the further end of the guide rail 27 as the door 15 is arrested by the stop 85 on the rail section 62. The latch 86 is provided preferably with a recessed portion 88 adapted to engage a pin or stop 89 within the door whereby the latch is prevented from substantial movement downward beyond the position illustrated. When the door 13 is moved into engagement with the guide rail 24 of the door 14, the wheel 22 of the door 13 moves into engagement with a stop pin 91, Fig. 10, on the guide rail 24 of door 14 thereby preventing forward movement of the door 13 beyond the door 14 and, as the door 13 is moved into substantial matching relation with the door 14, the latch 86 of the door 13 falls over and engages the further end or a notched portion in the further end of the guide rail 24 of the door 14, as the case may be, thereby locking the door 13 to the door 14.

As the door 14 is moved outwardly by the cams 57 it carries with it the door 13 locked thereto. The pair of doors 13 and 14 are moved into substantial matching relation with the door 15 as the guide rail 23 of the door 14 is fully extended until the forward wheel 22 of the door 14 is arrested by the stop 91 of the door 15, Fig. 12, at which time the latch on the door 14 engages the further end of the bottom guide rail of door 15 thereby effectively locking the door 14 to the door 15. The doors 13, 14 and 15 are now locked together and move as a unit on the guide rail 62 after the rail section 23 of the door 15 has been moved outward by the cam members 59 thereof.

It will be understood that the foregoing operations required for fully opening the doors 13, 14 and 15 are substantially the same as the operations required for opening the doors 16, 17 and 18, the doors 16, 17 and 18 being provided with slideable supporting mechanism controlled by a hand wheel mounted on the opposite end of the car in substantially the same manner as the hand wheel controlling the operation of the doors 13, 14 and 15. When it is desired to open the door 15, the hand wheel is rotated sufficiently to withdraw the protruding end 83 of the shaft 84 out of the path of travel of the wheel 22 of the door 15.

When it is desired to close the doors 15, 14 and 13, the latch 86 of the door 15 is moved out of engagement with the lower guide rail 27 and the door 15 is rolled from the upper rail section 62 and along the adjoining rail section 23 of the door 15 until the wheel 22 of the door 15 engages the stop member 92 of the rail section. When this occurs, the wheels 22 will be in alinement with and engage two depressions 80 in the movable rail section 23 for the door 15. An arrangement is thus provided in which the locked doors 13, 14 and 15 are prevented from accidental movement along the movable rail section 23 of the door 15 during the movement of the rail section from or to the retracted position thereof. The doors 13, 14 and 15 are now moved to the retracted position by the rotation of the hand wheel.

The latch 86 of the door 14 is raised sufficiently to be disengaged from the lower guide rail 25 of the door 15 and the door 14 is moved along the guide rail 24 of the door 15 and into engagement with the movable rail section 23 of the door 14 until the wheel 22 thereof is arrested by the stop pin 93 of the movable rail section 23 of the door 14 and comes to rest in alinement with the depressions 80 thereof, Figs. 11 and 20.

The hand wheel is rotated sufficiently to retract the movable rail section 23 of the door 14 thereby moving the door 14 to closed position and the door 13 in position to be transferred to the movable rail section 23 thereof. The latch 86 of the door 13 is disengaged from the lower guide rail 25 of the door 14 and the door 13 is moved along the rail 24 of the door 14 into engagement with the extended movable rail section 23 of the door 13 until the wheel 22 thereof is arrested by the stop member 93 of the rail 23, the door 13 being maintained in the arrested position with respect to the rail 23 by reason of the depressions 80 provided therein. The hand wheel is now moved sufficiently to retract the movable rail section 23 thereby causing the door 13 to be moved into the final or closed position thereof. The lock 77, Fig. 2, is now affixed to the hand wheel thereby securely locking the doors 13, 14 and 15 in the closed position. The same procedure is followed with respect to the doors 16, 17 and 18 thereby completely closing one side of the freight car and locking the same effectively.

As heretofore stated, the movement of each of the upper rail sections 23 is accompanied by a synchronous movement of each of the corresponding lower guide rail sections 29 whereby positive control of the upper and lower ends of the door is maintained at all times. Furthermore, it will be noted that as the door 15 moves into engagement with the upper movable rail section 23 during the closing of the door, the lower end of the door moves into engagement with the movable guide rail 29 of the door 15. In a similar manner, as the door 14 moves into engagement with the movable rail section 23 thereof, the lower end of the door 14 is engaged by the movable guide rail 29 thereof, and as door 13 moves into engagement with the movable rail section 23 thereof, the lower end of the door engages the corresponding movable guide rail 29. An arrangement is thus provided in which the doors are securely held in a closed position by the upper and lower cams respectively and are locked against moving by the cam and rail structure provided.

Whereas on Figs. 8 to 14 an arrangement is disclosed in which the doors 13, 14 and 15 are in alinement with each other and with the end section 11 of the car when the doors are in a closed position, various other arrangements and modifications may be employed without departing from the spirit and scope of the present invention. On Fig. 21 is disclosed one such alternative arrangement, the doors 13, 14 and 15 being in alinement with each other and in overlapping relation with respect to the end section 11 of the car. The doors 13 and 14 are each provided with movable guide rail sections 23 and the doors 14 and 15 are provided with outside rail sections 24 whereby the doors 13 and 14 may be carried by the door 15 as the doors are opened, the door 15 being adapted to slide or roll into matching position with the end section 11 without being extended outward from the car.

An alternative arrangement is disclosed on Fig. 22 in which the doors 13 and 14 are slightly overlapped when the doors are closed, the door 14 being in abutting relation with the door 15, and the door 15 slightly overlapped the end section 11 of the car. With this arrangement a single movable guide rail section 23 for the door 14 is required. The door 13 is adapted to be moved in front of the door 14 and supported by a guide rail 24 secured to the door 14. The hand wheel is operated sufficiently to move the door 14 to the extended position whereby the doors 13 and 14 are moved as a unit into matching position with the door 15 and supported by a guide rail 24 secured thereto. The hand wheel is additionally moved thereby to remove the locking pin 83 from the path of travel of the door 15. The doors 13, 14 and 15 are then moved as a unit into matching position with respect to the end section 11 by means of a fixed guide rail secured to the section 11 and extending above that portion of the door frame occupied by the door 15 when the doors are in closed position.

On Fig. 23 is disclosed still another alternative arrangement employing the present invention comprising an end section 94 and two movable doors 95 and 96, the end section 94 and doors 95 and 96 enclosing substantially one half of one side of the car when the doors are in a closed position. The door 96 is provided with a movable guide rail section whereby the door 96 may be moved inward or outward at will by a suitable cam arrangement. The door 95, as illustrated, is adapted to be moved in front of the door 96 and supported thereby without additionally extending the door 95 outward from the side of the car, and the door 96 is adapted to be extended from the side of the car sufficiently to permit the doors 95 and 96 to be moved as a unit into matching position with the end section 94.

In the arrangment of Fig. 22 the door 13 may be locked to the door 16 if desired and the supporting rail for the doors 13 and 16 may include suitable stop members whereby each of the doors is prevented from moving past the central position 97 between the two door sections and thus an arrangement is provided in which the doors 13 and 16 may be effectively locked in closed position. Furthermore, the door 14, it will be understood, is prevented from additional movement toward the central position 97 by the provision of a suitable stop such as the stop 93, Fig. 8, within the movable rail section therefor. An alternative arrangement for maintaining the doors 13 and 95 locked in closed position is the provision of suitable locking members 98 adapted to be retracted or extended, as the case may be, by suitable cam structure controlled by the hand wheel on the end of the car. It will, of course, be understood that the stop devices such, for example, as the devices 83, 93 and 98 are shown for the purpose of illustrating one of the many methods suitable for retaining the doors in locked position and it will be apparent to those skilled in the art that various other arrangements and instrumentalities may be employed for this purpose.

It will, of course, be understood that in each of the arrangements disclosed on Figs. 21, 22 and 23 all of the doors are securely maintained in the closed position, the open position, and in the intermediate positions at all times by suitable means and instrumentalities provided therefor such, for example, as the stop members 85, 91, 93 and the retaining devices of Figs. 18, 19 and 20, whereby inadvertent or accidental movement of the doors from any of their set positions is prevented.

Whereas the cam members 38, 53 and 78 are shown on the drawings as single or one-piece cams, it will, of course, be understood that, if desired, the cam members 38, 53 and 78 may be of the type known generally as split or separable cams in which the cams are composed of two or more complementary parts adapted to be clamped together by any suitable means whereby the assembly or replacement of the cams on their respective shafts may be accomplished without disturbing the shafts or the other cams assembled thereon or the supports therefor.

Briefly stated in summary, the present invention comprises new and improved means for easily opening substantially the entire side of a freight car whereby bulky articles of merchandise or freight such, for example, as lumber or long sections of pipe, poles, and the like may be loaded and unloaded without experiencing the delay occasioned by present types of car construction in which relatively small openings are employed in the sides of the car. Furthermore, an arrangement has been provided in which the car is securely locked at all times with the doors in the closed position thereof and the doors are prevented from accidental or inadvertent movement during the process of opening or closing the same and during the time the doors are in the fully opened position.

While the invention has been described in reference to several preferred examples thereof which give satisfactory results, it will be understood by those skilled in the art to which the invention pertains, after understanding the invention, that various changes, modifications and instrumentalities may be employed without departing from the spirit and scope of the invention, and it is my intention, therefore, in the appended claims to cover all such changes, modifications and instrumentalities.

What is claimed as new and desired to be secured by Letters Patent of the United States is:

1. In a railroad car for the transportation of freight, the combination of a plurality of slideable doors in substantially abutting relation with each other, means including a plurality of wheels for supporting said doors, a plurality of rail members supported by said doors and adapted to be engaged by the wheels of an adjacent door as said doors are moved, a plurality of movable rail sections for supporting the doors in closed position thereof, and means including a plurality of pairs of cam devices respectively associated with each of the rail sections and secured thereto for moving said rail sections in successive order into alinement with the rail members of the adjacent doors.

2. In a railroad car for the transportation of freight having a plurality of slideable doors on each side thereof, means including a plurality of rotatable members for supporting said doors, a plurality of track members secured to said doors and adapted to be engaged by the rotatable supporting members of the adjacent door, a plurality of track sections in substantial alinement with each other and adapted to be moved into alinement with the track members of the succeeding doors, and means including a rotatable shaft for moving said track sections into alinement with said track members successively in a predetermined sequential order.

3. A freight car having a plurality of doors in substantial alinement with each other, means including a plurality of track sections for slideably supporting said doors, a plurality of alined track members secured to said doors and adapted to be engaged by said supporting means of the adjacent doors, means including a pair of cam devices secured to the first track section for moving the first track section and door into alinement with the track member of the second door, and means including a plurality of pairs of cam devices respectively secured to each of the succeeding track sections for thereafter moving each succeeding track section into alinement with the track section of the next successive door.

4. In a railroad car for the transportation of freight, the combination of a plurality of slideable doors in substantially abutting relation with each other, a plurality of wheels secured to each of said doors, a plurality of tracks secured to said doors and adapted to be engaged by the wheels of an adjacent door when the adjacent door is moved to open position, a plurality of movable rail sections having a home position and a moved position respectively associated with each of said doors and adapted to be engaged by said wheels and support the doors in closed position thereof, a rotatable shaft means including a pair of cam devices secured to said rotatable shaft for moving said rail sections and doors in predetermined sequential order from said home position to said moved position into alinement with the tracks of successive doors whereby the doors may be transferred from the movable rail sections to the tracks of successive doors in succession, and an end section on said car having a fixed rail thereon adapted to be engaged by the wheels of the door adjacent thereto when the movable rail associated therewith has been moved to said moved position thereby to support all of the doors by said fixed rail when the doors are moved to said open position.

5. In a car for the transfortation of freight having an opening therein through which the freight is adapted to be moved, the combination of a plurality of movable track sections disposed above said opening, a plurality of doors respectively suspended from said movable track sections and adapted to close said opening, a rotatable shaft means including a plurality of cam devices secured to said shaft and operably connected to said track sections for moving the track sections to an extended position in successive order, and means for supporting each of said doors by the adjacent door as the track sections are moved successively to said extended position.

6. In a car for the transportation of freight having an opening therein through which the freight is adapted to be moved, a plurality of movable rail sections disposed in alined relation with each other above said opening, a plurality of doors respectively suspended from said movable rail sections in abutting relation and adapted to close said opening, a rotatable shaft means including a plurality of cam devices arranged on said shaft progressively in pairs for moving said rail sections in successive order to an extended position, means for supporting each of said doors on the next succeeding door as the doors are moved to said extended position, a pair of end sections on said car adjacent said opening, and means secured to said end sections for supporting all of said doors when the rail sections adjacent said opening have been moved to the said extended position.

7. In a car for the transportation of freight having an opening in each side thereof through which the freight is adapted to be moved, a plurality of alined doors adapted to close said opening when the doors are in the closed position, a rotatable shaft having a plurality of cam devices thereon operable in predetermined sequential order as the shaft is rotated, means for rotating said shaft, means controlled by said cam devices for moving the doors outward from said car in successive order, means effective when each of the doors is moved outward for transferring the moved door from said moving means to the next succeeding door, and means effective when each of the doors has been transferred to said succeeding door for locking each of the transferred doors to the next succeeding door.

8. In a freight car having an opening in each side thereof through which the freight is adapted to be moved, a plurality of sliding doors in abutting relation with each other adapted to close said opening, a plurality of rail sections slideably supported above said opening for supporting the respective doors in closed position thereof, a pair of cam devices respectively associated with each of said rail sections and secured thereto for actuating said rail sections in successive order, means including a shaft for controlling said cam devices, means for transferring each of said doors from the respective rail section to the adjacent door as each of the rail sections is actuated by said cam devices, means for locking all of the doors together when the doors have been transferred from the respective rail sections, a pair of end sections respectively adjacent each side of said opening, and means for supporting all of said doors from said end sections.

9. In a railroad car for the transportation of freight having an opening therein through which the freight is adapted to be moved, a plurality of rail sections associated with the doors respectively for supporting the doors in closed position thereof, means including a plurality of pairs of cam devices respectively associated with each of said rail sections and secured thereto for actuating the rail sections in successive order to a moved position, means for transferring each door from the associated rail section to the next succeeding door as the rails and doors are moved to said moved position, means for locking each of the doors to the succeeding door, and means for removing all of the doors from the last rail section when said last rail section has been moved to said moved position.

10. A freight car having a plurality of slideable doors on a side thereof adapted to enclose an aperture disposed between two end sections of the car, a plurality of slideable supports for said doors, means including a plurality of cam devices for actuating said supports in predetermined sequential order, means for transferring the doors in successive order from each of the support to the next support as the supports are moved by said actuating means, and means for supporting all of the doors on said end sections independently of said movable supports.

11. In a box car for the transportation of freight, the combination of a plurality of slideable doors in substantial abutting relation with each other adapted to enclose an aperture within the side of the car, a pair of relatively small end sections respectively disposed at each end of the car, a pair of fixed supporting rails disposed opposite each of said end sections respectively, means including a plurality of rotatable cam devices for slideably moving each of the doors in succession transversely to an extended position, means adapted to support each of the doors by the next succeeding door when the doors have been moved to said extended position, and means for slideably supporting all of said doors from said supporting rails opposite said end sections and parallel thereto.

12. In a freight car for the transportation of bulky merchandise such as lumber and the like having a pair of end sections in each side thereof and an aperture therebetween through which the freight is adapted to be moved, the combination of a plurality of supporting doors and a pair of center doors adapted to close said aperture within each side of the car, each of said supporting doors having a track section secured thereto, a plurality of wheels respectively associated with each of said doors and adapted to support the same, a plurality of movable rail sections respectively associated with each of the doors and adapted to be engaged by said wheels, a rotatable shaft means including a plurality of cam devices secured to said shaft and controlled thereby for moving the rail sections and doors in successive order to a predetermined position from the side of the car into alinement with the track sections of the adjacent doors whereby the doors are adapted to be transferred in successive order from the rail sections to the track sections of the adjacent doors, and means for transferring all of the doors from the last rail section to said end sections when the last rail section has been moved to said predetermined position.

13. In a car for the transportation of freight having a pair of end sections in each side thereof and an opening therebetween through which the freight is adapted to be moved, a plurality of alined doors adapted to close said opening, each of said doors having a plurality of wheels thereon for supporting the doors, a plurality of rail sections slideably arranged above said opening for supporting the respective doors in the closed position thereof, means including a rotatable cam for moving said rail sections and doors outward in predetermined successive order, a shaft supporting said cam, means for rotating said shaft and cam, a plurality of alined tracks arranged on the doors adapted to be engaged by the wheels of the adjacent doors when the adjacent doors and respective rail sections are moved outward, means for preventing accidental movement of the doors along the rail sections as the rails are moved outward, means for preventing movement of each of the doors beyond a matched position with the adjacent door as the doors are transferred from said rail sections to the tracks of the adjacent doors, and means for locking each of the doors in matched position with the adjacent door.

14. In a car for the transportation of freight having an opening in each side thereof through which the freight is adapted to be moved, a plurality of doors in substantial abutting relation adapted to close said opening, means including a rotatable shaft for moving said doors outward from the side of the car in predetermined successive order, means for supporting each of said doors by the adjoining door as the doors are moved outward from said side of the car, a pair of end sections respectively adjacent each end of said opening, means for transferring all of said doors to said end sections, and means controlled by said shaft for locking said doors to said end sections after the doors have been transferred thereto.

15. In a car for the transportation of freight having an opening in each side thereof through which the freight is adapted to be moved, a plurality of sets of doors adapted to close said opening, a pair of end sections arranged on each side of the car respectively adjacent said opening at opposite sides thereof and having means for slideably supporting the doors of each of said sets respectively, a rotatable shaft, means including a plurality of cam devices secured to said shaft and controlled thereby for moving the doors of each of the sets outward from the side of the car in predetermined sequential order, means for supporting each of the doors on the next succeeding door when the doors have been moved outward, means for locking each of the doors to the next succeeding door, and means controlled by said shaft for locking all the doors of each set to the associated end section when the doors are slideably supported thereon.

16. In a car having an opening in each side thereof through which freight is adapted to be moved, a plurality of slideable doors in substantial abutting relation with each other adapted to close said opening, each of said doors having a pair of wheels thereon for supporting the doors, a plurality of rail sections adapted to engage said wheels and support the doors in the closed position thereof, a rotatable shaft having a plurality of cam devices thereon adapted to move said rail sections outward from the side of the car in sequential order as the shaft is rotated, means for rotating said shaft, a plurality of track sections arranged on said doors in alinement with the rail sections of the adjacent doors when the rail sections of the adjacent doors are moved outward by said cam devices whereby the adjacent doors are adapted to be transferred from said rail sections to the track sections of the next succeeding door, means for preventing accidental movement of the doors along the rail sections as the rail sections are moved outward, means for arresting the movement of each of the doors along said track sections of the adjacent doors beyond a predetermined position thereof, means for locking each of the doors to the adjacent door in said predetermined position, a pair of end sections respectively adjacent opposite sides of said opening having fixed supporting means thereon adapted to support said doors in the open position thereof, a stop member on each of said fixed supporting means, means for transferring the locked doors from the last rail section to said fixed supporting means when the last rail section has been moved outward, and means for locking said locked doors to said fixed supporting means when the doors have been moved in engagement with said stop member.

17. In a car for the transportation of freight having an opening in each side thereof through which the freight is adapted to be moved, a plurality of slideable doors adapted to close said opening and having a plurality of wheels thereon for supporting the doors, a plurality of rail sections adapted to be engaged by said wheels and support the doors in abutting relation with each other thereby to enclose said opening, a plurality of guide members corresponding respectively to said rail sections adapted to slideably engage the lower portion of each of said doors, means including a plurality of cam members for moving the rail sections and corresponding guide members synchronously in predetermined sequential order to a predetermined position outward from the side of said car, said cam members being adapted to prevent accidental movement of said rail sections and guide members at all times, a plurality of track devices supported by said doors adapted to be engaged by the wheels of each of the next succeeding doors and support the next succeeding door in matched relation thereto when the next succeeding door has been moved outward from the side of said car by the rail section and guide member thereof, a plurality of guide devices disposed on said doors adapted to receive and slideably guide the lower end of each of said next succeeding doors when the wheels of said succeeding doors are in engagement with said track devices, and means for locking each of said succeeding doors to the adjacent door when the succeeding door has been moved into matching relation with said adjacent door.

18. In a car for the transportation of freight having an opening in each side thereof through which the freight is adapted to be moved, a plurality of slideable doors adapted to close said opening and having a plurality of wheels thereon for supporting the doors, a plurality of movable rail sections respectively associated with the doors adapted to be engaged by said wheels and support certain ones of said doors in abutting relation with the others of the doors when the doors are in closed position, means including a rotatable cam for moving said rail sections and associated doors to a predetermined moved position outward from the side of the car, a shaft supporting said cam, means for rotating said shaft and cam, an end section adjacent opposite ends of said opening, a fixed track section secured to the side of the car above a portion of said opening and adapted to be engaged by the wheels of the doors adjacent said end section whereby said adjacent doors may be rolled along said fixed track section into a fully opened position in matched relation with said end section, means for transferring said certain ones of the doors to said adjacent doors when the movable rail sections thereof have been moved outward to said predetermined position, and means for locking all of the doors in said fully opened position.

19. In a box car for the transportation of freight having an opening in each side thereof, a pair of end sections arranged adjacent said opening at each end of the car, a pair of slideable end doors respectively adjacent each of said end sections, a plurality of intermediate slidable doors in abutting relation with each other and with said end doors and in overlapping relation to said end sections whereby all of said doors are adapted to close said opening, means including a plurality of movable rail sections for opening the doors in predetermined sequential order, means for supporting each of the opened doors by the next succeeding door, means including a rotatable shaft for actuating said movable rail sections in said predetermined sequential order, means adapted to slideably support all of said intermediate doors by said end doors, means adapted to slideably support the end doors with the opened doors thereon in matching relation with said end sections, and means controlled by said rotatable shaft for preventing movement of the end doors into said matching relation with the end sections until said intermediate doors are supported by the end doors.

20. In a box car for the transportation of freight having a pair of end sections respectively disposed in each side thereof and an aperture therebetween of greater size than said end sections, a plurality of doors adapted to close said aperture, each of said doors corresponding substantially in size to one of said end sections, means including a rotatable shaft having a plurality of cam devices thereon for opening each of the doors in predetermined successive order, means for slideably supporting each of the opened doors by the adjacent door, and means for supporting all of the opened doors in matching relation with said end sections.

21. In a freight car having an opening in each side thereof through which the freight is adapted to be moved, a plurality of sliding doors in abutting relation with each other adapted to close said opening, a plurality of rail sections slideably supported above said opening for supporting the respective doors in closed position thereof, a pair of cam devices respectively associated with each of said rail sections and secured thereto for actuating said rail sections in successive order, means including a shaft for controlling said cam devices, a plurality of guide members slideably supported below said opening adapted to maintain the doors parallel to the side of the car when the doors are in closed position, a second pair of cam devices respectively associated with each of said guide members and secured thereto, means controlled by said shaft for causing the guide members to be actuated by said second pair of cam devices synchronously with the actuation of said rail sections respectively, means for transferring each of said doors from the respective rail section to the adjacent door as each of the rail sections is actuated by said cam devices, and means for transferring the transverse control of the lower portion of the doors from the guide members to the adjacent door as the doors are transferred from the respective rail sections.

MILLER M. BRISTER.

CERTIFICATE OF CORRECTION.

Patent No. 2,320,216. May 25, 1943.

MILLER M. BRISTER.

It is hereby certified that error appears in the printed specification of the above numbered patent requiring correction as follows: Page 2, first column, line 41, for "elevating" read --elevation--; and second column, line 10-11, for "arrangement" read --arrangements--; page 3, second column, line 22, for "section" read --portion--; line 49, for "accomplished" read --accompanied--; page 5, first column, line 26, for "overlapped" read --overlapping--; page 6, first column, line 71, second column, line 12, and page 7, first column, line 47, after the word "shaft" in each instance insert a comma; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.